United States Patent Office 3,578,725
Patented May 11, 1971

3,578,725
NOVEL CATALYST SYSTEM FOR ISOMERIZING HYDROCARBONS
Donald E. Jost, Media, Edward J. Janoski, Havertown, and Abraham Schneider, Philadelphia, Pa., assignors to Sun Oil Company, Philadelphia, Pa.
No Drawing. Filed Aug. 9, 1968, Ser. No. 751,378
Int. Cl. C07c 5/28
U.S. Cl. 260—683.75                                      9 Claims

ABSTRACT OF THE DISCLOSURE

In the isomerization of $C_4$–$C_7$ paraffins with an aluminum halide catalyst, it has been found that higher yields are obtainable and at lower temperatures, when the reaction is carried out in the presence of both a support and a solvent for the aluminum halide catalyst.

BACKGROUND OF THE INVENTION

This invention relates to an improved process for the isomerization of paraffins. More particularly, this invention relates to a method for increasing the rate of isomerization of $C_4$–$C_7$ paraffins while carrying out the reaction at relatively low temperatures by providing a heterogeneous reaction system comprising both a solvent and a support for the aluminum halide catalyst.

It is a well-known practice to provide selected solid inorganic filler materials such as pumice, bauxite, silica gel, alumina, carbon or the like as support for the aluminum halide catalyst in isomerization processes. See, for example, U.S. Pats. 2,353,098 and 2,374,507. When the aluminum halide is deposited on the selected support, more catalytic surface area is thereby provided.

Alternatively, instead of such supporting material, it has been the practice in some processes to use a solvent for the aluminum halide catalyst in order to get as much of the catalyst into solution as possible. See, for example, U. S. Pats. 2,361,452 and 2,410,024 which teach the use of such solvents as alkyl halides, carbon disulphide, and tetrachloroethane for aluminum chloride in the isomerization of n-butane, n-pentane and the like. In the case of the alkyl halide, it will be noted, large excesses of this material must be present in order for it to act as a solvent.

As further illustration of the use of a solvent system for the isomerization of paraffins, reference is also made to copending application filed in the name of Jost et al., entitled Aluminum Halide Isomerization of Saturated Hydrocarbons, which teaches that rates of isomerization may be increased at relatively low temperatures when the solvent is present in amounts of from 10 to 50 volume percent of the hydrocarbon feedstuff, and when, further, the aluminum halide catalyst is present in amounts in excess of what would be soluble in the solvent and paraffin feedstuff at the temperature employed.

None of these prior art teachings, however, shows or even suggests the combined use of both a support and a solvent for the aluminum halide cataylst since such a system would, in accordance with general principles, be a completely contradictory one. That is to say, since, on the one hand, it is the purpose of the alumina, fuller's earth or the like to provide a surface on which the catalyst may be sorbed, while on the other hand it is the purpose of the solvent to distribute the aluminum halide in the solvent system, such a combination of systems would appear to be mutually exclusive and a nullity.

SUMMARY OF THE INVENTION

Notwithstanding the foregoing considerations, it has now been found, in accordance with the present invention, that, most surprisingly, when paraffins are isomerized, using an aluminum halide catalyst in the presence of both an inorganic solid supporting material and an inert halogenated hydrocarbon solvent, higher yields are obtainable at lower reaction temperatures than has heretofore been possible. Most notably, it has been found that even the addition of very small amounts of less than 1 percent of solvent to an aluminum halide-on-support system results in a marked increase in isomerization rates at lower reaction temperature than have heretofore been possible.

DESCRIPTION OF THE PREFERRED EMBODIMENTS

In carrying out the process of this invention the charge stock employed may be and $C_4$-$C_7$ normal paraffin hydrocarbon, i.e., n-butane, n-pentane, n-hexane, n-heptane or mixtures thereof, althought the $C_5$-$C_6$ hydrocarbons are preferred. When these starting materials are treated in accordance with the present process there are obtained the corresponding isobutane, isopentane, neo-hexane and the like.

The halogenated hydrocarbon solvent employed must be inert at the isomerization reaction conditions. Thus, such compounds as ethyl chloride, t-butyl chloride and like alkyl halides are unsuitable inasmuch as they react with the aluminum halide catalyst to form hydrogen chloride, and polymeric materials which substantially deactivate the aluminum halide catalyst. Accordingly, suitable solvents may be selected from such compounds as methylene chloride and pentachloroethane and the like, although 1,1,2,2-tetrachloroethane is most preferred.

It is desirable, although not essential, that the halogenated hydrocarbon have a higher or lower boiling point than the hydrocarbon fraction being produced in order that it can be more readily separated from this final product by distillation and recycled to the reactor.

The solvent should be present in amounts of 0.05 percent to 35 percent by volume based on the volume of the hydrocarbon feedstuff, and preferably from 0.1 percent to 10 percent. Below these amounts the isomerization rate falls off considerably, while above these amounts excessive cracking of the hydrocarbon feedstuff takes place.

The inorganic solid support material may be any suitable inert porous substance such as pumice, bauxite, fuller's earth, silica gel or the like, although finely powdered alumina or carbon is preferred.

The amount of support material employed depends upon such properties of the support as porosity, surface area and density. Thus, for example, in the case of the preferred alumina or activated carbon, the amount may range from 10 to 300 weight percent of such material based on the weight of the aluminum halide catalyst, although 20 to 200 percent is preferred.

The catalyst for this process, as mentioned above, is an aluminum halide, and preferably aluminum chloride or aluminum bromide. The catalyst must be present in amounts in excess of what would be soluble in the solvent-hydrocarbon mixture at the temperatures employed, and preferably a large excess in amounts of from 5 to 25 times by weight the theoretically soluble amount, particularly when small amounts of solvent in the range of from less than one percent to ten percent are used.

In addition to the catalyst, inorganic support, and solvent there should be included in the reaction medium, and preferably mixed with the charge stock, a naphthene to serve as a cracking inhibitor. Thus, methylcyclopentane, methylcyclohexane or the like should be added to the extent of about 5 to 25 volume percent of the hydrocarbon charge stock. Alternatively, if a dearomatized naphtha is used as the charge stock, it will generally include within it sufficient naphthene to act as cracking inhibitors without it being necessary to introduce additional naphthenes.

As a further cracking suppressor there may also be employed hydrogen. This hydrogen may be introduced into the reactor by pressuring the reactor with from 25 to 100 p.s.i.g. hydrogen partial pressure.

A catalyst promoter should also desirably be added to the reaction to prevent rapid deactivation of the aluminum halide catalyst. As promoters, hydrogen halides, and preferably hydrogen chloride, may be employed, in quantities which are relatively small in proportion to the catalyst present. The addition of about 15 p.s.i.g. dry hydrogen chloride has been found to be satisfactory for the purpose.

Since the reaction is carried out under liquid phase conditions, any temperature below the critical temperature of the hydrocarbon-solvent mixture may be employed. However, it has been found that under the conditions of this process, temperatures of from about 25 to 150° C. are most satisfactory, and preferably temperatures of from 50 to 90° C.

The reaction time will naturally vary depending upon the other reaction conditions. In general, however, the reaction time may range from 5 minutes to 2 hours, and preferably from 10 to 30 minutes, during which period, when, for example, a $C_6$ fraction is being isomerized, there is obtained a conversion of about 60 to 90 percent per pass.

Superatmospheric pressure may, if necessary, be employed to maintain the reactants in liquid phase conditions. However, the temperature and pressure conditions should always be adjusted so as to avoid as much as possible any cracking and/or disproportionation. Fortunately, one of the outstanding advantages of the present process is the relatively very low temperature and short residence time of the reactants in the reactor, thereby substantially reducing such side reactions and increasing the yield per pass above what has thus far been achieved in the art.

The reaction may be carried out either as a batch process or as a continuous operation. In the latter case, the reactor may be a stirred vessel, or an ebullating or fixed bed may be employed. The solvent may be recovered from the final product and unreacted feed by distillation and recycled to the reactor. The unreacted feed may likewise be recovered by a second distillation and recycled.

EXAMPLE I

A series of 14 runs were carried out wherein 5 cc. of a hydrocarbon mixture comprising 90% n-hexane and 10% methylcyclopentane, together with 1.2 gms. of $AlCl_3$, 1.8 gms. of Harshaw alumina and varying amounts of 1,1,2,2-tetrachloroethane solvent were charged to bombs pressurized up to 15 p.s.i.g. with HCl and then up to 60 p.s.i.g. with $H_2$, and allowed to react at the same temperature (65° C.) for the same period of time (20 minutes). The product in each case was a mixture of hydrocarbons of which 2,2-dimethylbutane(neohexane) was the desired product.

The results of these tests are shown in the following table:

TABLE I

| Run | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Solvent, vol. percent [1] | 0 | 0.2 | 0.3 | 0.4 | 0.5 | 0.8 | 1.2 | 1.4 | 3.0 | 4.0 | 5.0 | 10.0 | 20.0 | 30.0 |
| Conversion, wt. percent [2] | 19.1 | 28.7 | 30.8 | 31.0 | 32.6 | 33.2 | 33.7 | 34.6 | 37.2 | 37.5 | 37.8 | 38.0 | 39.0 | 39.5 |

[1] In excess of hydrocarbon.
[2] Neohexane in hexane fraction.

By contrast, when an additional run was carried out wherein all of the above conditions remained constant except that no alumina and no solvent was employed, the weight percent of neohexane converted from n-hexane was 0.24 percent.

From the foregoing figures it will be seen that the addition of even a small amount of an inert halogenated solvent to an $AlCl_3$–$Al_2O_3$ catalyst system results in a remarkable increase in the percentage conversion of normal hydrocarbon to its isomer. This is particularly surprising when there is further taken into account the fact that the reaction can advantageously be carried out at temperatures substantially below those employed by the prior art.

What is claimed is:

1. A process for the isomerization of paraffins having from 4 to 7 carbon atoms which comprises contacting said paraffins containing not more than 25 volume percent of a naphthene, with an aluminum halide catalyst, a halogenated hydrocarbon solvent which is inert to the conditions of the reaction, a hydrogen halide promoter, hydrogen, and an inorganic support material for said catalyst comprising alumina or carbon, wherein the solvent is present in amounts of from 0.2 to 35 volume percent based on the volume of paraffin feedstuff, the aluminum halide catalyst is present in amounts in excess of what would be soluble in the solvent and paraffin at the temperature employed, and wherein the inorganic support material is present in amounts of from 10 to 300 weight percent based on the aluminum halide catalyst.

2. The process according to claim 1 wherein the solvent is selected from the group consisting of methylene chloride, pentachloroethane, and 1,1,2,2-tetrachloroethane.

3. The process according to claim 1 wherein the reaction temperature is from 25 to 150° C.

4. The process according to claim 1 wherein the reaction temperature is from 50 to 90° C.

5. The process according to claim 1 wherein the catalyst is present in amounts of from 5 to 25 times by weight in excess of what is soluble in the solvent and paraffin.

6. The process according to claim 1 wherein the alumina is present in amounts of from 50 to 200 weight percent based on the weight of the aluminum halide catalyst.

7. The process according to claim 1 wherein the catalyst is aluminum chloride.

8. The process according to claim 1 wherein the paraffin is n-hexane.

9. A process for the isomerization of $C_4$–$C_7$ paraffins which comprises contacting said paraffins containing not more than 25 volume percent of a naphthene, with aluminum chloride, hydrogen chloride, hydrogen, 1,1,2,2- tetrachloroethane, and alumina at a temperature of from 25 to 150° C., wherein the 1,1,2,2-tetrachloroethane is present in amounts of from 0.2 to 35 volume percent based on the volume of the paraffin feedstuff, the aluminum chloride is present in amounts of from 5 to 25 times by weight in excess of what would be soluble in the solvent and paraffin feedstuff at the temperature employed and wherein the alumina is present in amounts of from 50 to 200 weight percent based on the weight of the aluminum chloride.

References Cited

UNITED STATES PATENTS

| | | | |
|---|---|---|---|
| 2,334,553 | 11/1943 | Harding | 260—683.7 |
| 2,361,452 | 10/1944 | Brown | 260—683.76 |
| 2,410,024 | 10/1946 | Fawcett et al. | 260—683.76 |
| 2,411,835 | 11/1946 | Ross et al. | 260—683.75 |

DELBERT E. GANTZ, Primary Examiner

G. J. CRASANAKIS, Assistant Examiner